(No Model.)
F. BAIN.
LUBRICATOR.
No. 360,405. Patented Apr. 5, 1887.
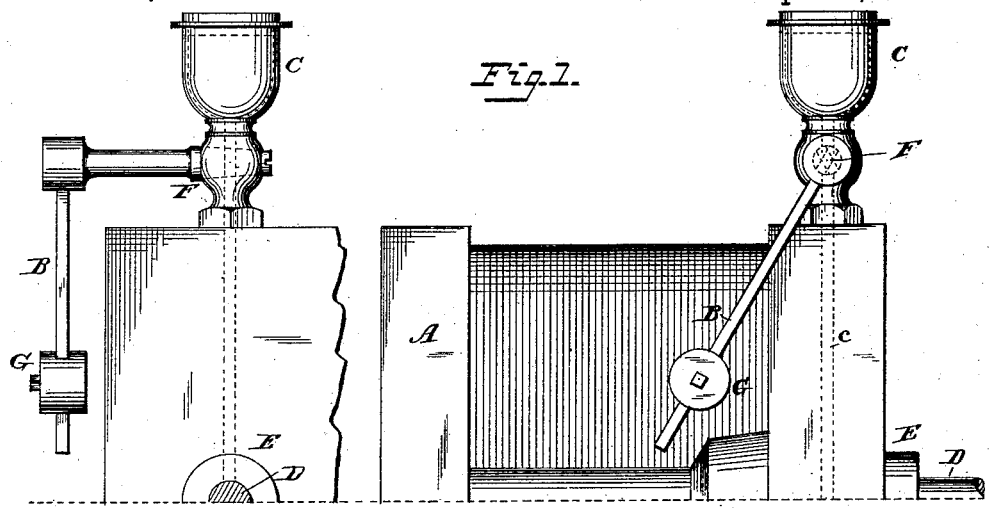
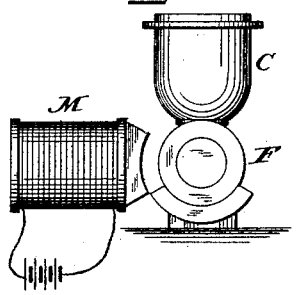
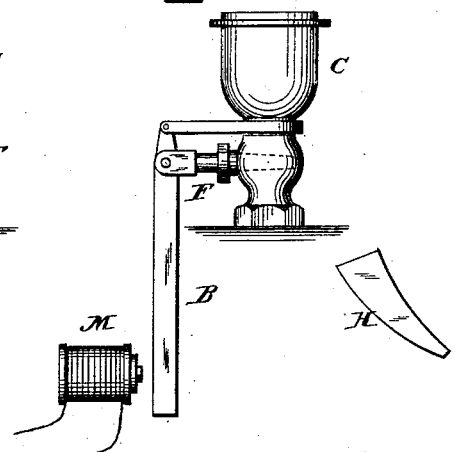
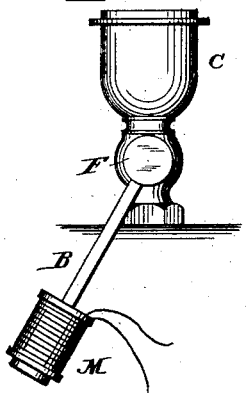
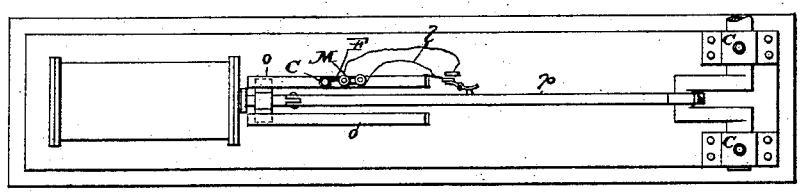
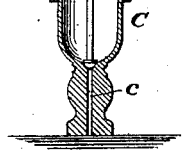
Attest:
Cout A Cooper
J. Campbell
Inventor:
Force Bain
by
Foster & Freeman

UNITED STATES PATENT OFFICE.

FORÉE BAIN, OF CHICAGO, ILLINOIS.

LUBRICATOR.

SPECIFICATION forming part of Letters Patent No. 360,405, dated April 5, 1887.

Application filed November 22, 1883. Serial No. 112,525. (No model.)

*To all whom it may concern:*

Be it known that I, FORÉE BAIN, a citizen of the United States, and a resident of Chicago, Cook county, Illinois, have invented certain new and useful Improvements in Lubricators, of which the following is a specification.

My invention relates to lubricators and to means for adjusting and regulating the same so that the flow or feed of the lubricating substance—such as oil—may be accurately controlled in accordance to the amount of work done and the requirements of the machine; and it consists in a method of and means for controlling the supply of lubricating material by the agency of electro-magnetism.

In fast-running machinery in which the journals are automatically lubricated—as, for instance, electric generators or motors—a great deal of attention is necessary in order to prevent the journals becoming hot. The supply of lubricating material must be kept up, and at the same time if too much is supplied it is thrown off by the centrifugal action of the journal, and the lubricant is wasted, besides being thrown upon the machine, floor, and other surrounding objects.

The most practical lubricator of which I am aware is one in which the valve is manually operated to turn on or off the supply of lubricant and to regulate its flow according to the necessities of the case. Besides requiring constant attention, it often happens that the attendant forgets to properly set the oiler or turn it off when the machine is stopped for any cause. In the first instance the journal quickly heats, and consequently wears, requiring more power to drive it, and in the second the journal bearing or box becomes flooded and overflows, or when the machine is started the lubricant is thrown off by the rotation of the journal. My invention is intended to overcome these difficulties, to economize in the use of the lubricant, and at the same time to regulate the flow thereof so that a sufficient quantity is supplied to keep the journal properly lubricated in accordance with the amount of work brought to bear upon it.

In the accompanying drawings, Figure 1 shows a manner of applying my invention to an electric generator or motor. Figs. 2, 3, 4, 5, and 6 are ways of applying it to other machinery.

I will first describe one way of applying my invention to an electric generator similar to the one shown in my Patent No. 287,610, granted to me October 30, 1883.

Upon the top or any other convenient position on the machine is placed a vessel, C, containing the lubricating material and being connected by a channel or passage, c, with the shaft or journal D of the machine, running in the journal bearing or box E.

A suitable valve or cock, F, or other controlling means, is placed in any convenient position so that it will control the passage c, and to this valve is fastened a rod or lever, B, of any material, preferably non-magnetic. Upon the rod B is adjustably secured, by a screw or otherwise, a ball or weight, G, of magnetic material. The normal position of this rod B when the machine is not running is in a perpendicular position. As soon as the machine is started in operation the pole-piece A of the field-magnet becomes energized and attracts the ball or weight G upon the rod B, and causes it to assume more or less approximately a horizontal position, thereby opening the valve or cock F accordingly.

It is understood that the field-magnet pole A is energized more or less according to the amount of work done by the machine, and it consequently attracts the ball G more or less, it acting as an armature to the magnet A, opening the valve F and allowing the lubricant to be fed to the journal in proportion to the amount of work done, and consequently the journal and its bearing or box is lubricated to the proper amount, so that no oil or other lubricant is wasted.

When the machine stops for any cause, it is obvious the ball or weight will not be attracted, and will resume its normal position, (substantially perpendicular,) and the valve being thus closed the lubricant cannot flow and flood the bearing. The ball being adjustable, the proper ratio of movement may be accurately obtained between the magnetic power of the field-magnet A and the amount of lubricant necessary to properly supply the journal, and this ratio is maintained in accordance with the strength of the current generated in the machine.

In Fig. 2 the pendulous arm or lever is shown as being supplied with a coil or helix, M, which is electrically connected with some part of the circuit of the machine and acts upon a mass of iron, H, which may be part of the generator or motor, or attached thereto.

In Fig. 3 a different form of valve is shown, and the arm or lever B is operated upon by the coil or magnet M, placed in proper position and connected electrically with the generator or motor.

In Fig. 4 a similar arrangement is shown, the operation of which will be readily understood.

Fig. 6 shows an electro-magnet placed upon top of the cup and adapted to lift the iron valve inside of the cup, more or less, according to the strength of the current flowing through the helix of the magnet M.

It is obvious that the lubricator may be applied to machines or bearings other than electric generators or motors, and to other parts than the journals and bearings therefor, and the flow of the lubricant controlled by the electric current from a generator of any kind.

Many modifications of the details of the arrangement of the device will readily suggest themselves to those skilled in the art, and I wish it distinctly understood that I do not confine myself to any of the details shown, they serving only to illustrate the principle of my invention, which will be applied in a manner to suit the requirements of each particular case.

The valve or other controlling device may be arranged to be opened and closed intermittently, as by the opening and closing or shunting of the electric current, which operation may be governed by the movement of the machine being lubricated, and this is especially useful in steam or gas engines. In such instances the electricity may be supplied from any source. One arrangement of this kind is shown in Fig. 5, where the cross-head connected to the pitman $p$ moves upon the bearings $o$ $o$, the valve F of the oil-cup C being operated by the making or breaking of the electric circuit at each reciprocation of the pitman, which is arranged to interrupt the circuit-wire $l$, thereby operating the valve for an instant to allow a fresh amount of lubricant at each movement. By this means it is obvious the amount of oil supplied to the bearings will depend upon the speed of the engine.

Many other similar applications of the principle of my invention will be apparent.

Other devices than a cock or valve may be used to control the flow of the lubricant—as, for instance, electric capillary tubes—or, in short, any device or arrangement that is subject to electric or magnetic influence.

What I claim is—

1. The method, substantially as herein set forth, of lubricating the bearings of an electric generator or motor, which consists in automatically controlling the feed or flow of the lubricant to the bearings by and in accordance with the varying electric current produced or work done by the generator or motor.

2. The combination, substantially as herein set forth, with a lubricator having a suitable valve or cock, of an electro-magnet for operating said valve, and means whereby the operation of the magnet is controlled by the work done by the machine being lubricated.

3. The combination, substantially as herein set forth, with an electric generator or motor, of a lubricator, the valve of which is provided with means whereby its position is controlled in accordance with work done by said generator or motor.

4. The combination, substantially as herein set forth, with an electric machine, of a lubricator, an arm or lever attached to the valve of the lubricator, and an adjustable magnetic ball or weight attached to the arm, whereby the valve may be operated by the varying strength of the magnetic field.

In testimony whereof I have signed my name to this specification in the presence of two subscribing witnesses.

FORÉE BAIN.

Witnesses:
WM. HARRISON FRENCH,
R. WATERMAN.